United States Patent [19]

McMullin

[11] Patent Number: 4,868,468
[45] Date of Patent: Sep. 19, 1989

[54] SCREENED INDUCTANCE SENSORS FOR BRUSHLESS D.C. MOTORS

[75] Inventor: Francis McMullin, Ennis, Ireland

[73] Assignee: Kollmorgen Corporation, Simsbury, Conn.

[21] Appl. No.: 182,243

[22] Filed: Apr. 15, 1988

[30] Foreign Application Priority Data

Apr. 16, 1987 [IE] Ireland ................. 1008/87

[51] Int. Cl.⁴ .................................................. H02K 29/12
[52] U.S. Cl. ........................................ 318/254; 318/138
[58] Field of Search ..................... 318/138, 254, 439

[56] References Cited

U.S. PATENT DOCUMENTS

| | | | |
|---|---|---|---|
| 4,259,603 | 3/1981 | Uchiyama et al. | 318/254 X |
| 4,305,024 | 12/1981 | Kuroki | 318/254 |
| 4,612,486 | 9/1986 | Ban et al. | 318/254 |
| 4,737,698 | 4/1988 | McMullin et al. | 318/661 X |

FOREIGN PATENT DOCUMENTS

| | | | |
|---|---|---|---|
| 0191366 | 8/1986 | European Pat. Off. | 318/254 |
| 55-88555 | 7/1980 | Japan | 318/254 |
| 57-71259 | 5/1982 | Japan | 318/254 |
| 57-80297 | 5/1982 | Japan | 318/254 |
| 60-98860 | 6/1985 | Japan | 318/254 |
| 0900353 | 1/1982 | U.S.S.R. | 318/254 |
| 1534492 | 12/1978 | United Kingdom . | |

Primary Examiner—Bentsu Ro
Attorney, Agent, or Firm—Morgan & Finnegan

[57] ABSTRACT

In a screened inductance sensor for a brushless d.c. motor, a sensor rotor carrying conductive screens is mounted on an extension of the motor shaft. A single solenoidal drive winding on a stator of the sensor establishes a drive field, when energized, which induces a voltage in a sense winding, also carried on the stator. This sense winding is laid around the periphery of a notional cylinder coaxial with the rotor and stator and has series-connected loops of generally rectangular configuration when viewed in development. The screens pass between the drive winding and the sense winding in operation of the sensor to modulate the sense winding output by shading the drive field. The single drive winding is located radially inwardly of one axial end of the sense winding, so that this axial end is aligned with an axially central region of the drive winding midway between its axial ends.

17 Claims, 5 Drawing Sheets

SCREENED INDUCTANCE SENSORS FOR BRUSHLESS D.C. MOTORS

BACKGROUND OF THE INVENTION

1. Field of the invention

The present invention relates to sensors, and, in particular, to position sensors for providing signals indicative of the position of a moving member relative to some fixed datum. By appropriate processing of the position signals, further signals indicative of the speed of movement of the moving member relative to this datum may also be derived. Sensors of this kind are particularly suitable for use with electrical machines, such as, inter alia, brushless d.c. drives and synchronous motors. The invention is particularly directed to a cylindrical embodiment of sensor especially suited to establishing commutation signals for a brushless d.c. drive.

2. Position of the prior art

Position and speed sensors of the foregoing kind form the subject of co-pending patent application Ser. No. 789,147, now U.S. Pat. No. 4,737,698. According to this application, there is provided a sensor comprising a drive or exciting winding for establishing a forward or drive field, at least one secondary or sense winding in which a voltage may be induced in the presence of said forward or drive field, and at least one conductive screen within which eddy currents are generated in the presence of said forward or drive field to establish a counter-field opposing said forward or drive field, said at least one conductive screen and said at least one secondary or sense winding being displaceable relative to one another within said forward or drive field so that said at least one secondary or sense winding may be shaded by said at least one conductive screen to a varying extent to thereby vary the voltage induced in said at least one secondary or sense winding, the relative displacement of said at least one conductive screen and said at least one secondary or sense winding being limited to substantially a single direction of displacement, said drive or exciting winding being configured so that in the absence of said at least one conductive screen said forward or drive field is substantially even over said at least one secondary or sense winding in said single direction of relative displacement of said at least one conductive screen and said at least one secondary or sense winding, said at least one secondary or sense winding being a two-terminal winding, and said at least one conductive screen having a surface region which is substantially parallel to a notional surface defined by said at least one secondary or sense winding.

In a particular configuration, said surface region of said at least one conductive screen is a sector of a cylindrical surface and said at least one secondary or sense winding is disposed about the periphery of a notional cylinder substantially concentric with said cylindrical sector surface region, said at least one conductive screen and said at least one secondary or sense winding being relatively displaceable in a circumferential direction about the substantially common axis of said cylindrical surface and said notional cylinder. In such constructions of sensor, the drive field is typically established by a pair of axially spaced apart cylindrical or solenoidal coils, each of which may be of relatively short axial extent.

The sensor of the invention of said co-pending application may also comprise a further secondary or sense winding, the progressive shading of which during said relative displacement of said at least one conductive screen and said at least one secondary or sense winding proceeds in a manner substantially identical with the progressive shading of said at least one secondary or sense winding during said relative displacement, said further secondary or sense winding being disposed relative to said at least one secondary or sense winding so that the progressive shading of said further secondary or sense winding during said relative displacement is spaced apart from that of said at least one secondary or sense winding. Preferably, the voltage variations in each said secondary or sense winding during said progressive shading follow a cyclic pattern and said further secondary or sense winding is disposed relative to said at least one secondary or sense winding so that said voltage variations are in phase quadrature.

In an especially favoured arrangement, said at least one secondary or sense winding has first and second coils, said coils being connected so that in the presence of said forward or drive field the voltage induced in the second coil in the absence of said at least one conductive screen is substantially equal in magnitude but opposite in polarity to the voltage induced in the first coil. In said especially favoured arrangement, said at least one secondary or sense winding has a plurality of coils extending in said single direction of relative displacement and each successive coil in said single direction of relative displacement is wound in the opposite electrical sense to each adjacent coil.

The sensor of the invention of co-pending application Ser. No. 789,147 may be adapted to a multiplicity of circumstances and desired output signals, and, in a particular arrangement, said at least one secondary or sense winding has at least one coil having a pitch or extent in said single direction of relative displacement and said at least one conductive screen has a pitch or extent in said single direction of relative displacement which is substantially equal to the pitch or extent of said at least one coil, said at least one conductive screen having a dimension in a direction at right angles to said single direction of relative displacement which is substantially constant over said pitch or extent of said at least one conductive screen and said at least one secondary or sense winding having a dimension in a direction at right angles to said single direction of relative displacement which is substantially constant over said pitch or extent of said at least one coil.

Said co-pending application also discloses a sensing system comprising a sensor having a drive or exciting winding for establishing a forward or drive field, at least one secondary or sense winding in which a voltage may be induced in the presence of said forward or drive field, and at least one conductive screen within which eddy currents are generated in the presence of said forward or drive field to establish a counter-field opposing said forward or drive field, said at least one conductive screen and said at least one secondary or sense winding being displaceable relative to one another within said forward or drive field so that said at least one secondary or sense winding may be shaded by said at least one conductive screen to a varying extent to thereby vary the voltage induced in said at least one secondary or sense winding, said relative displacement of said at least one conductive screen and said at least one secondary or sense winding being limited to substantially a single direction of displacement, said drive or exciting winding being configured so that in the absence of said at least one conductive screen said forward or drive field is substantially even over said at least one secondary or sense winding in said single direction of relative displacement of said at least one conductive screen and said at least one secondary or sense winding, and said at least one secondary or sense winding being a two-terminal winding, and said at least one conductive screen having a surface region which is substantially parallel to a notional surface defined by said at least one secondary or sense winding, means for applying an alternating voltage to said drive or exciting winding, and means for processing the output signal from said at least one secondary or sense winding to provide a signal indicative of the relative disposition of said at least one conductive screen and said at least one secondary or sense winding.

BRIEF SUMMARY OF THE INVENTION

The present invention is directed to certain advantageous developments of sensors of the kind described by said co-pending patent application, and in particular, to adaptations of such sensors specifically configured for the provision of commutating signals in brushless d.c. motors.

According to the present invention, there is provided a sensor comprising a stator and a rotor, the rotor being mounted for rotational displacement relative to the stator but being substantially fixedly located relative to the stator in the direction of the axis of relative rotor and stator rotation, the stator having a substantially cylindrical or solenoidal drive or exciting winding for establishing a forward or drive field and a secondary or sense winding in which a voltage may be induced in the presence of said forward or drive field, the secondary or sense winding being a two-terminal winding, extending around the periphery of a notional cylinder which is substantially coaxial or concentric with said cylindrical or solenoidal drive or exciting winding, and having a plurality of coils or loops extending circumferentially of said notional cylinder, each successive coil or loop in a direction circumferential of said notional cylinder being wound in the opposite electrical sense to each adjacent coil or loop, and each said coil or loop having two circumferentially spaced-apart, axially-extending winding portions and two axially spaced-apart, circumferentially-extending winding portions so that each said loop or coil substantially defines a rectangle in a development of the generally cylindrical secondary or sense winding, and the rotor having a conductive screen within which eddy currents are generated in the presence of said forward or drive field to establish a counter-field opposing said forward or drive field, said conductive screen being rotatable with the rotor relative to the stator so that said conductive screen is displaceable relative to said secondary or sense winding in a direction circumferential of said notional cylinder, and said conductive screen having a surface region which is substantially parallel to a notional cylindrical surface defined by said secondary or sense winding, said secondary or sense winding being shaded by said conductive screen to a varying extent during rotation of the rotor relative to the stator to thereby vary the voltage induced in said secondary or sense winding, said drive or exciting winding being configured so that in the absence of said conductive screen said forward or drive field is substantially even over said secondary or sense winding in said direction of relative displacement of said conductive screen and said secondary or sense winding, and said drive or exciting winding being disposed radially inwardly of the circumferentially-extending winding portions of the secondary or sense winding at one axial end thereof.

Preferably, the drive or exciting winding is disposed so that said circumferentially-extending winding portions of the secondary or sense winding at said one axial end thereof are generally aligned in the radial direction with an axially central region of the drive or exciting winding extending over a portion thereof located substantially midway between its axial ends to thereby establish a substantially uniform, locally axially-directed drive field in the region of said winding portions. Said circumferentially-extending winding portions of the secondary or sense winding at said one axial end thereof suitably substantially define a plane intersecting said cylindrical or solenoidal drive winding at a location substantially midway between the axial ends of the drive or exciting winding. The drive or exciting winding may be distributed over an axial length which is a multiple of, and typically several times, the maximum thickness or diametrical dimension of any of said circumferentially-extending winding portions of the secondary or sense winding inwardly of which said cylindrical or solenoidal drive or exciting winding is disposed, and said circumferentially-extending winding portions are generally aligned with said axially central region of the drive or exciting winding so that said substantially uniform, locally axially-directed drive field may be established in the region of said winding portions. This arrangement substantially minimises the effect of axial differences in the positions of said circumferentially-extending winding portions or end-turns on the flux linked by the coils or loops of the secondary or sense winding, and thus results in such axial misalignment or variation causing minimal distortion of the output waveform.

The conductive screen is preferably of dimensions substantially corresponding to those of each coil or loop of the secondary or sense winding, so that said conductive screen substantially overlies a said coil or loop when aligned therewith. In this way, there is uniform progressive shading of each loop or coil during rotor rotation.

Preferably the conductive screen is extended at each axial end to project axially outwardly of the respective planes defined by the circumferentially-extending winding portions at the axial ends of the secondary or sense winding. The sensitivity of the axial location of the circumferentially-extending winding portions at the other axial end of the secondary or sense winding from that aligned with the axially central region of the drive or exciting winding is then also substantially minimised by the rotary screen substantially fully covering these winding portions and establishing minimum field levels in their vicinity. In an especially preferred configuration, the conductive screen is located at the outer periphery of a rotor disc portion, with which it is most suitably integrally formed. Said rotor disc portion may be aligned with said other axial end of the secondary or sense winding to provide enhanced local screening of the circumferentially-extending portions (or outer end-turns) in this region. The conductive screen, or at least a major part of it, then extends axially from this rotor disc portion towards the first axial end (or inner end-turns) of the secondary or sense winding.

In a favoured construction of the sensor of the invention, a two-part stator is provided. A radially inner cylindrical portion of the stator carries the drive or exciting winding, while a radially outer, likewise cylindrical stator portion carries the secondary or sense winding. The conductive screen is supported on or forms part of the rotor so that it moves between the drive or exciting winding and the secondary or sense winding during rotation of the rotor. The rotor also includes an axially-extending sleeve portion underlying the drive or exciting winding radially inwardly thereof to provide a flux path for the drive field in the region of a shaft portion, which may be an extension of the rotor shaft of a brushless d.c. motor, on which the sensor rotor is mounted, and thus establish local screening for the shaft portion. The radially outer portion of the stator is suitably slotted on an inner face region thereof to accommodate the axially-extending portions of the loops or coils of the secondary or sense winding. This outer stator part preferably also carries a feedback winding for association with an oscillator of power supply means for exciting the drive winding.

In an especially preferred arrangement, a second secondary or sense winding is provided on said outer stator part, the coils or loops of said second secondary or sense winding being spaced apart on said notional cylinder from those of the first-mentioned secondary or sense winding, so that the shading of each loop of coil of the second secondary or sense winding is spaced apart in time from the shading of a loop or coil of the first-mentioned secondary or sense winding. The two secondary or sense windings are preferably disposed so that their respective outputs during rotation of the rotor are in phase quadrature. A two screen arrangement may find application in a sensor of the foregoing especially preferred construction.

BRIEF DESCRIPTION OF THE DRAWINGS

The invention and a preferred embodiment thereof will now be described having regard to the accompanying drawings in which.

DETAILED DESCRIPTION OF THE DRAWINGS

A sensor according to the invention has a drive or exciting winding for establishing a forward or drive field, at least one secondary or sense winding in which a voltage may be induced in the presence of said forward or drive field, and at least one conductive screen within which eddy currents are generated in the presence of said forward or drive field to establish a counter-field opposing said forward field. The screen and secondary winding are displaceable relative to one another within said drive field so that said at least one secondary winding may be shaded by said at least one screen to a varying extent to thereby vary the voltage induced in said at least one secondary winding. The present invention is directed to constructions of sensor in which said relative displacement of said at least one screen and said at least one secondary or sense winding is limited to substantially a single direction of displacement, and in particular, is directed to rotational constructions of such sensors.

Figure 1:
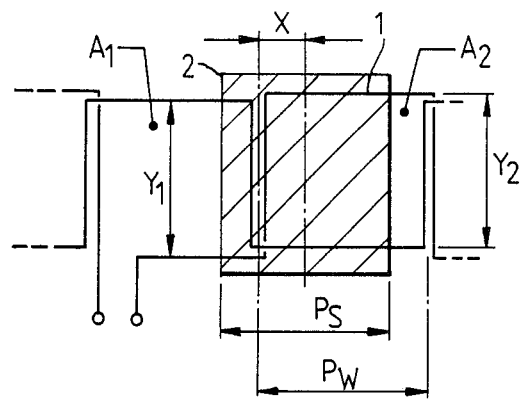
FIG. 1 is a schematic representation of the basic sense winding arrangement for a sensor according to the invention.

A preferred configuration of sense winding is shown in planar or developed form in FIG. 1. This configuration of winding is adapted for piecewise linear modulation of output signals. The winding 1 is laid out in a series of generally rectangular loops or coils extending in said single direction of relative screen and secondary or sense winding displacement, successive loops or coils $A_1, A_2$ of the winding 1 being in phase/antiphase, and the winding is shaded by a generally rectangular screen 2 of substantially the same dimensions as each loop or coil of the winding. A drive winding (not shown in this schematic drawing) establishes a substantially even field distribution over the area of the sense coils, at least along the axis of motion in said single direction of relative displacement.

The pitch of the sense winding in said direction of relative displacement is designated by $P_w$ and the span $P_s$ of the generally rectangular screen in said direction of relative displacement is approximately the same as the winding coil span. Thus linear ramp modulation is achieved, as described in said co-pending application. In a practical construction, as subsequently described, two or more screens are used, the screens being spaced apart by a distance substantially equal to the coil pitch. In such an arrangement, with the use of concentrated, full-pitch sense windings and full-pitch screens, the cross-sectional areas of unscreened magnetic flux (strong field) located between the screens and the cross-sectional areas of screened flux (weak field) underlying the screens, linking with the sense winding, vary in a piece-wise linear manner with the displacement of the screens. For steady motion, the demodulated sense voltage will approach a triangular waveform. Triangular output wave shapes allow derivation of a speed signal by analog differentiation or by differencing, and facilitate derivation of digital position signals.

Figure 2:
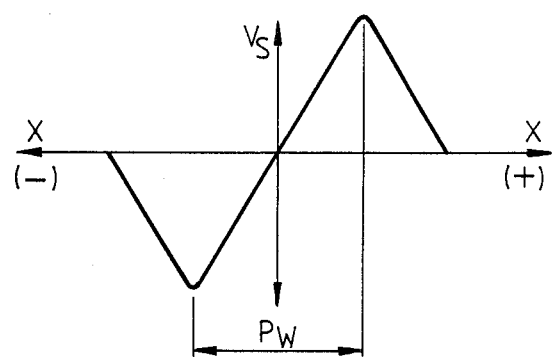
FIG. 2 shows the demodulated output derived from a winding arrangement in accordance with that of FIG. 1.

FIG. 2 shows a triangular output signal derived from the sense winding 1 of FIG. 1. The distance between the positive and negative peaks corresponds to the coil pitch $P_w$ of the sense winding.

The planar representation of sense winding depicted in FIG. 1 may also be regarded as a development of a cylindrical geometry, in the practical embodiment of which the winding and screen pattern of FIG. 1 are, as it were, wrapped around to lie on the surfaces of coaxial notional cylinders. Preferably the sense winding is then fixed, while the screen is rotationally displaceable about the common axis of said notional cylinders, so that the screen moves in relatively close juxtaposition to the sense winding but at a spacing from it along a notional cylindrical surface parallel to and spaced from the notional cylindrical surface defined by the wrapped-around sense winding. In this way, the required shading of the coils or loops of the sense winding in the direction of displacement of the screen or screens is achieved. Such a geometry is particularly suited to coping with an axial play or displacement of the rotating member on which the screen is mounted, such as may occur in the case of the rotor of an electric motor.

Figure 3:
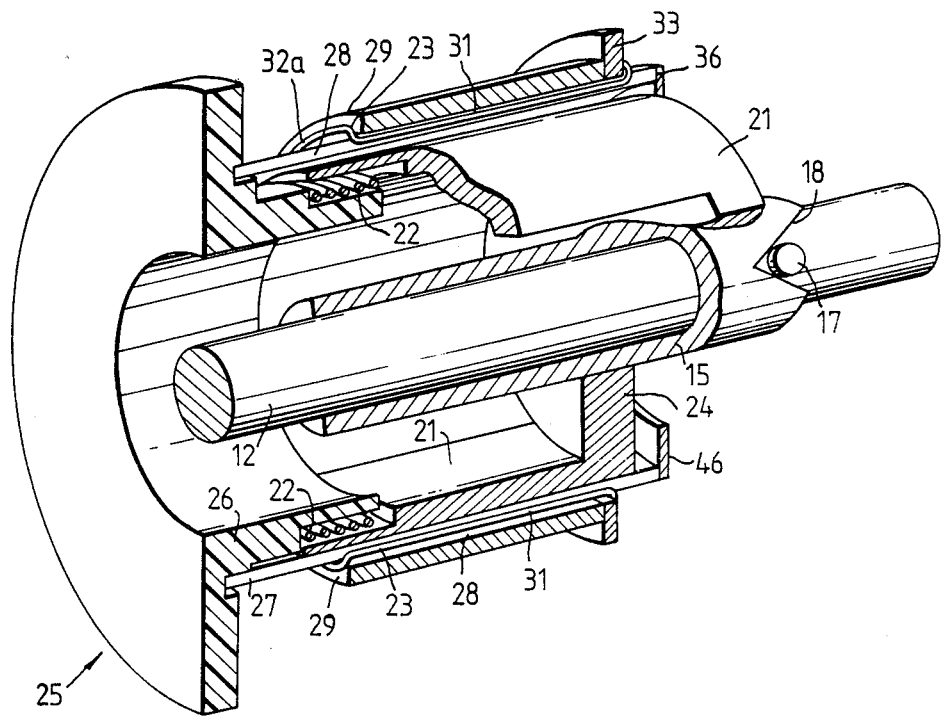
FIG. 3 is a pictorial part-sectional representation of a preferred construction of sensor according to the invention, the sectioning being on a generally axial plane.
Figure 4:
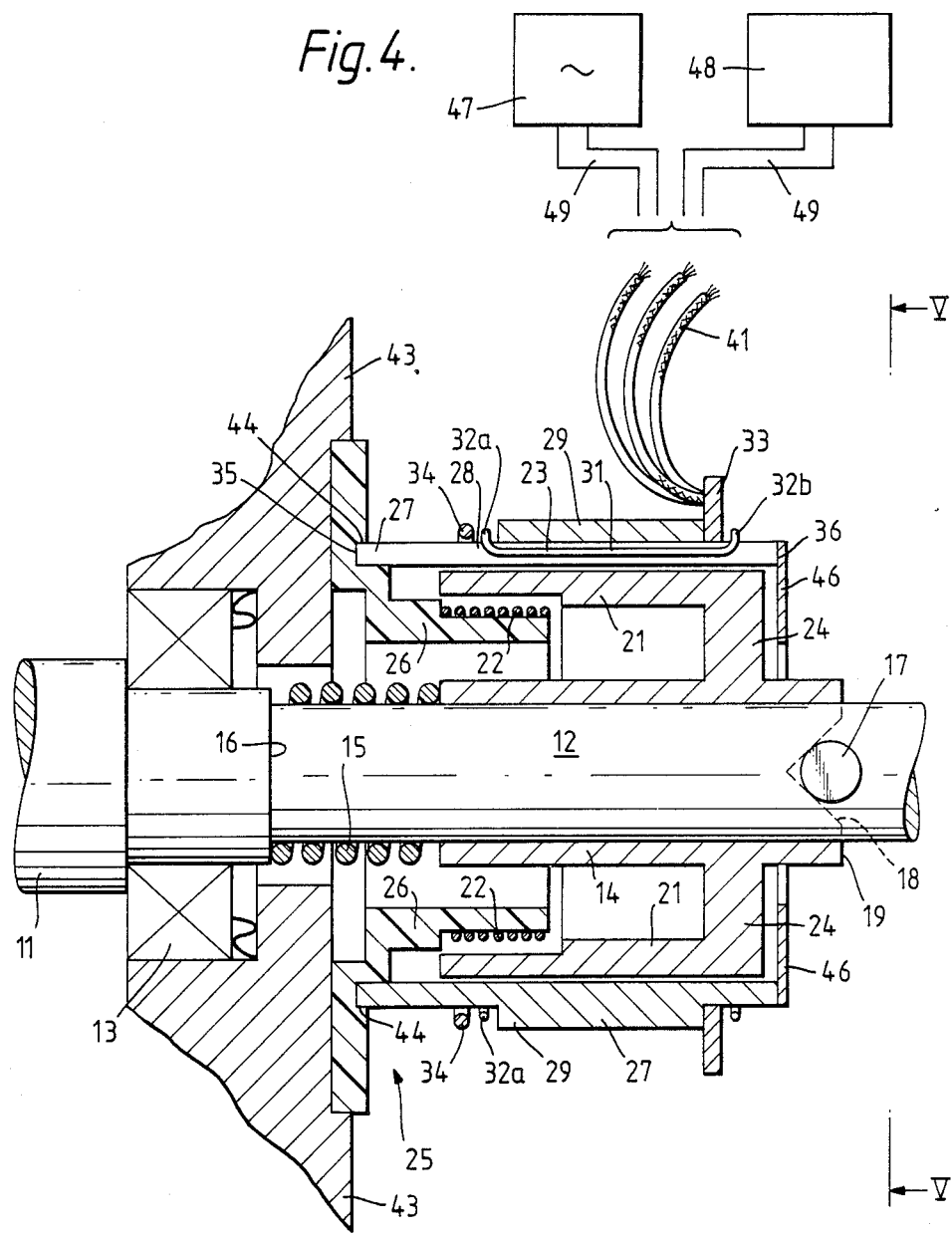
FIG. 4 is an axial sectional view of the sensor of FIG. 3, on the plane IV—IV of FIG. 5.
Figure 5:
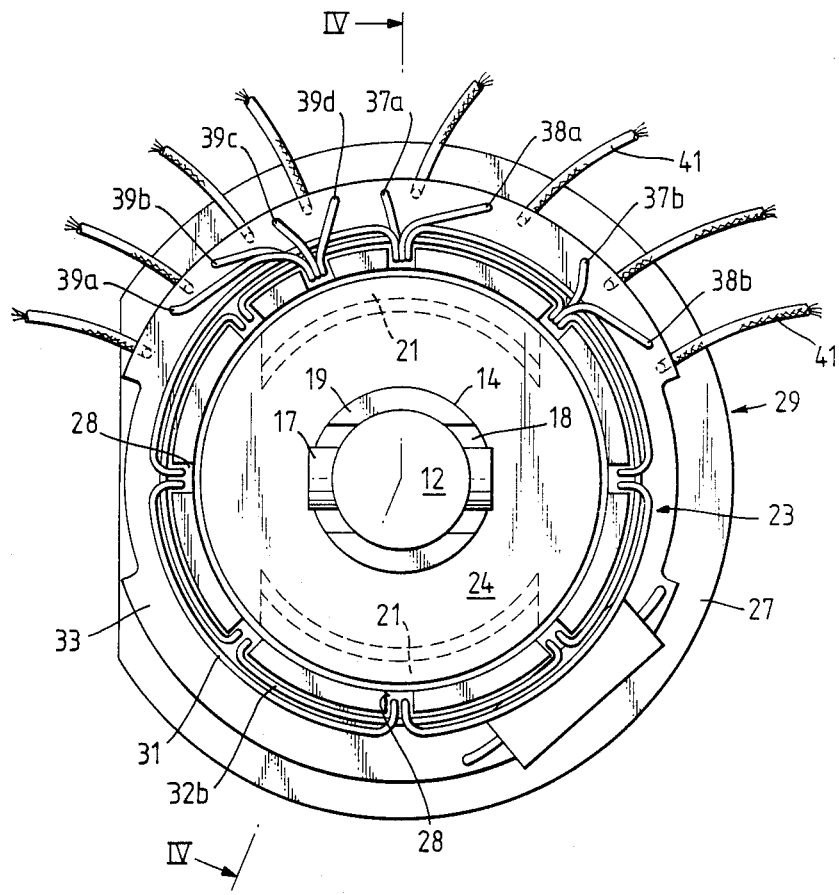
FIG. 5 is an end view of the sensor of FIG. 3 on the plane V—V of FIG. 4.

A favoured rotational construction of the present invention is shown in FIGS. 3, 4 and 5, although, for clarity, certain features of the associated motor are omitted from the pictorial view of FIG. 3, while the printed circuit, indicated in the end view of FIG. 5 and serving to link the machine windings with ancillary circuitry, is similarly not represented in FIG. 3, for the same reason. The sensor of the invention is mounted at one axial end of the rotor shaft 11 of a brushless machine, on an extension 12 of the rotor shaft extending beyond one, 13, of the main shaft bearings of the motor. A conductive rotor 14 is sleevingly mounted on this shaft extension 12, along which it is urged in an outward direction by a compression spring 15 acting against a shoulder 16 of the shaft 11 in the vicinity of the seat of bearing 13. This outward force is resisted by a retaining pin 17 which is received in a transverse bore in shaft extension 12. The axial ends of pin 17 project outwardly of the peripheral surface of shaft extension 12 and engage in V-shaped notches 18 in the periphery of the end face 19 of the sleeve-form rotor 14. The rotor 14 is made from any conductive material, such as aluminium or copper, and supports a number of screens 21, in the present case two, which are physically interposed between drive 22 and sense 23 windings of the sensor, to be described. As shown in the drawings, the screens 21 are supported by a disc portion 24 of the rotor, extending radially outwardly in the vicinity of the axially outward end of the rotor, and the screens 21 then extend rearwardly from the periphery of disc portion 24 in the direction of the motor on which the sensor is mounted, being thus cantilevered from disc portion 24 towards the motor. Disc 24 and screens 21 are suitably integrally formed as a single member.

Figure 8:
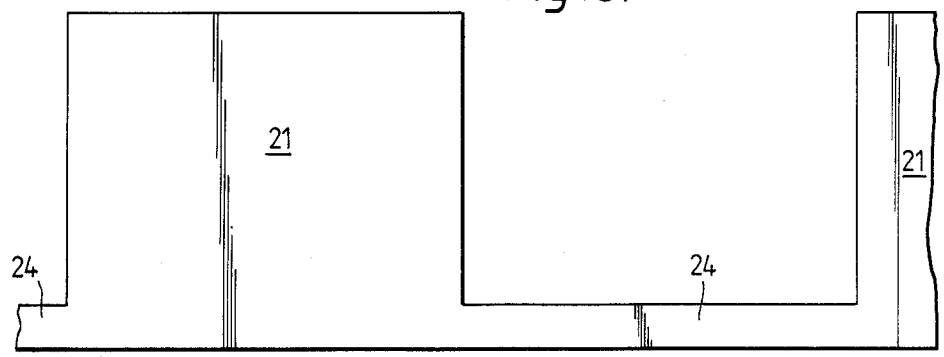
FIG. 8 shows a development of a portion of the rotor of the sensor of FIGS. 3 to 6, indicating, in particular, the arrangement of the screens.

FIG. 8 is a development of the rotor, showing one of screens 21 in full and a portion of the second screen, as well as portions of disc 24 extending between the screens. For clarity in this developed view, the underlying sleeve portion 14 of the rotor is omitted. A two-part stator 25 carries the drive 22 and sense 23 windings. Stator 25 is secured to an end-wall portion 43 of the brushless machine, on which the sensor is mounted. The divided two-part stator construction facilitates manufacture. In alternative configurations, the stator may consist of more than two parts. The stator 25 is made from any non-magnetic, non-conductive material, for example, from thermoplastics. A radially inwardly disposed cylindrical stator part or portion 26 carries the single drive winding 22, which consists of a solenoid type coil wound coaxially with the rotor 14.

A drive field is thus established by the single drive winding which is even in the direction of motion of the screen relative to the sense windings. The sensor of the invention is largely immune to field variation across the axis of motion. It is however necessary that the drive field have a substantially even or uniform distribution over the extent of the sense winding, in the absence of the screen, at least along individual paths swept out by points on the screen in the course of their normal motion, although a wholly uniform field distribution over the entire extent of the sense winding is not essential. In the case of the sensor of the invention, in which the single drive coil is cylindrical or solenoidal, paths of even or uniform field distribution prevail along circles centered on the axis of rotation and extending circumferentially around the notional cylinder on which the sense windings are located.

A second cylindrical stator part 27, disposed radially outwardly of and coaxially with the first part, carries the sense winding or windings 23. This stator part is provided with a series of axially inwardly openings or directed axial slots 28. At each axial region end of each slot 28, a respective circumferentially extending, external shoulder portion 29 of stator portion 27 is defined. In the assembled sensor, the axially extending slots 28 carry axially-extending portions 31 of each coil or loop of the generally rectangular-coil sense winding 23, while circumferentially-extending winding or coil portions 32a, and 32b are located substantially adjacent to a respective one of said shoulders 29, on the external periphery of stator part 27. Each sense winding coil portion 32a or 32b extends therefore around a portion of the periphery of stator portion 27, between circumferentially spaced-apart axially-extending slots 28. Thus substantially rectangular sense winding coils or loops, when considered in developed form, are readily defined. The axially inner, circumferentially-extending winding portions 32a, which may be referred to as the inner end-turns, i.e. those closest to the motor shaft 11, are located so as to be disposed in or define a radial plane which intersects the solenoid-form drive winding 22 substantially midway between its axial ends. A particular advantage of this configuration will be described subsequently.

Ferromagnetic flux return paths may be provided to increase signal levels, as described in said co-pending application. However, such a feature is not essential for satisfactory operation of the sensor of the invention. The arrangement now described provides reduced sensitivity of sense winding pattern to the position of the end-turns (i.e. the circumferentially extending portions 32a, 32b of the sense winding 23 turns or coils), ease of winding in the case of multi-turn coils, and also reduces drive current requirements.

An annular circular printed circuit board 33 may be used at the axially outer end of the stator part 27 carrying the sense winding 23, for making connections to said windings. This board may incorporate a shortened turn track, for limiting the field in the vicinity of the end-turns at this axial end of the device. These end-turns may be referred to as the outer end-turns.

A feedback winding 34, for oscillator stabilisation in accordance with arrangements described in said copending application, is shown in FIG. 4. This is wound in a continuous loop in the vicinity of the axially inner end-turns 32a of the sense winding 23, so that it links substantially all of the drive field "seen" by the sense windings. The connections to and from the various windings are shown in FIG. 5. 37a and 38a represent the start and end of a first secondary or sense winding, while 37b and 38b denote the start and end of a second or quadrature sense winding. 39a to 39d indicate the terminals of the drive and feedback windings, while the external connections from the PCB to the oscillator and the sensing circuitry are indicated by reference 41. The feeds to and from the windings are linked with the external connections 41 by suitable PCB tracks.

Figure 6:
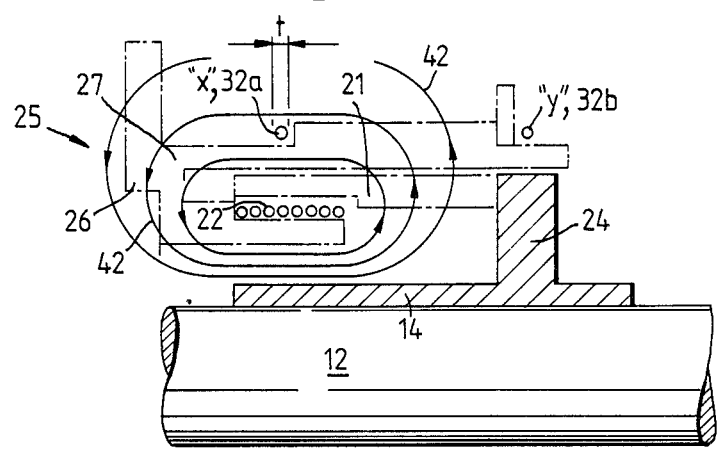
FIG. 6 is a diagrammatic axial sectional view of the sensor of FIGS. 3 to 5, showing certain significant interrelationships between the drive and sense windings.

FIG. 6 shows the relative placing of the inner end-turns 32a of the sense coils 23 (indicated by "x"), these being located axially centrally over the drive winding 22. Thus the single drive winding 22 is disposed radially inwardly of inner end-turns 32a, these turns being radially aligned with the axially central region of the drive winding, which extends over a portion of the winding substantially midway between its axial ends. The drive winding 22 is arranged to be distributed over an axial length of several times the sense winding end-turn thickness (designated by "t"). This ensures that the drive field direction is substantially axially normal to the plane of the sense winding end-turns, i.e. it is substantially uniform in the axial direction, as indicated by flux lines 42 in FIG. 6. Thus axial variations in the position of end-turns 32a, which are the most likely sources of error or imperfection likely to occur during winding of the sensor, will cause minimal variations in flux linkage of the sense winding coils 23, and thus will cause minimal distortion of the output waveform.

The same Figure also indicates how drive current requirements are reduced in the construction according to the present invention illustrated in FIGS. 3 to 5. The drive field represented conventionally by flux lines 42 has to pass axially through the radial gap between the drive winding 22 and the rotor shaft 12, which is normally made of steel. Due to the poor conductivity of steel, some of the field would penetrate the shaft and result in losses and heating, which would eventually be reflected in increased drive winding current, in the absence of appropriate corrective measures. These losses may be substantially reduced by providing a covering of conductive material for the shaft in the region of the drive winding 22. This conductive covering may suitably be formed as the sleeve part 14 of the rotor, as shown in FIGS. 3, 4 and 6. As already stated, the drive field is depicted in conventional form in FIG. 6 by flux lines 42, and the local screening of shaft 12 by rotor sleeve portion 14 will be noted.

FIG. 6 also illustrated an arrangement, shown in detail in FIGS. 3 and 4, useful in improving the linearity of the output waveform. As already mentioned, the axially inner end-turns "x" and the axially outer end-turns "y" of the sense winding coils should be located with minimum variation in their axial spacing, this spacing being indicated by dimensions $Y_1$ and $Y_2$ in FIG. 1 for adjacent coils of the sense winding. Location of the inner end-turns "x" or 32a over the axially central region of the single drive winding 22 minimizes the sensitivity to axial displacement of these end-turns. This placement is substantially optimized by the end-turns 32a being aligned with the axial mid-point or central transverse plane of solenoidal drive winding 22. The sensitivity of the location of the turns "y" or 32b at the outer end of the sensor may be similarly minimized by locally extending the rotary screens 21 to fully cover these end-turns and thus ensure minimum field levels in their vicinity. Thus the axial extent of the screens 21 is selected so that the screens 21 underlie and extend axially outwardly of the inner end-turns 32a of the sense winding 23, while the disc-form outer-end portion 24 of the rotor ensures that the end-turns 32b are also shaded, even in the circumferential gaps between the screens, as will be particularly apparent from FIG. 5. The provision of the disc-shaped, full-circular, rotor end portion 24 ensures that there is no possibility of a flux opening existing in respect of the outer end-turns 32b in any disposition of the rotor relative to the sense winding.

Figure 7:
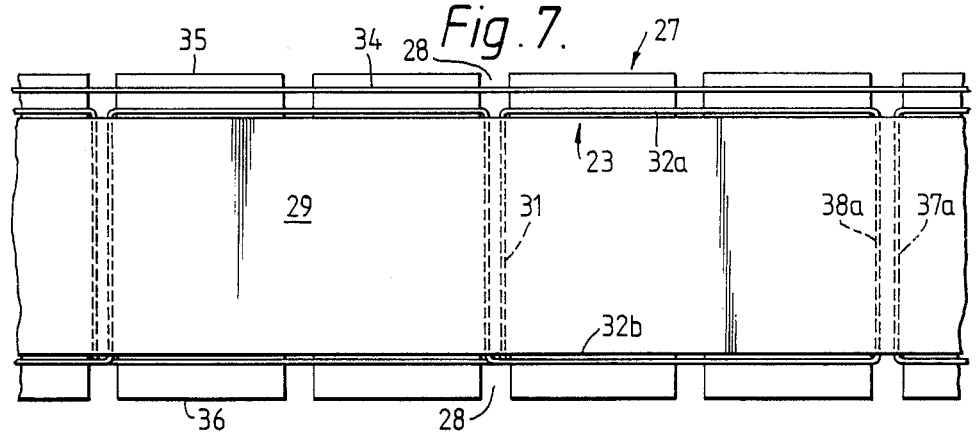
FIG. 7 shows a development of the winding and slot configuration of the stator of the sensor of FIGS. 3 to 6.

An advantageous winding technique for use in the sensor of the invention is now explained in regard to the development of part of the stator shown in FIG. 7. The second sense-winding supporting part 27 of the stator 25 is shown in developed form in this Figure. The slots 28 are cut fully through stator part 27 from its radially outer surface to its radially inner face at each axial end region 35, 36 of the stator part 27 and extend axially along the part 27 on its radially inner surface to underlie the external shoulder-defining portion 29 thereof. Shoulder-defining portion 29 thus represents an outer substantially cylindrical integral ring defining a radially outermost part of the integrally-formed stator portion 27. The sense winding is wound first of all as an external loop of wire of one or more turns, and is then threaded through the slots 28 in the pattern shown. The winding may be prepared on a former, the requisite number of turns for each coil or loop being made, and when it is then threaded through the slots, it just fills the available slot space. A second quadrature sense-winding is generally included, and may be housed in the vacant slots, of those depicted in FIG. 7. A single sense-winding having phase/antiphase coil pairs will not provide absolute position information over a complete electrical cycle. The additional information required to uniquely identify each position of the screen is, however, provided by the use of the second sense-winding, the outputs of the two windings being in phase quadrature by virtue of the respective slots accommodating the two windings being appropriately spaced apart circumferentially.

The parts 26 and 27 of the stator are assembled, following winding of part 27, by engaging end 35 of part 27 over a shoulder or top portion 43 of part 26, end 35 then being finally received in a circumferential slot or groove 44 in a radially-extending generally plate-form stator portion 45, located radially outwardly of cylindrical, drive winding carrying portion 26. These features are shown in FIG. 3 and, more particularly, in FIG. 4. Also shown in FIG. 4 is an axial outer end protecting or cover portion 46, extending radially inwardly from axial end 36 of stator part 27. Portion 46 is omitted from FIG. 5, for clarity, while the circuit board 33 of FIG. 5 is omitted from FIG. 4, for the same reason.

A power oscillator indicated schematically by reference 47 in FIG. 4 is used to feed the drive winding 22 with alternating voltage of a suitable frequency. The oscillator is stabilized by the feedback winding 34 shown in FIG. 4 in particular. In the present construction, this coil is wound with the secondary or sense-winding 23, but it does not form part of this secondary winding. Also depicted in schematic manner in FIG. 4 is signal processing means 48, adapted to receive signals from said sense winding of the sensor and operate on them as required in order to provide a desired output, or outputs, whether indicative of rotor position or speed of rotation, or both. Leads designated generally by reference 49 enable communication between input means 47 and sensor external connectors 41 and likewise between processing means 48 and lines 41. Said co-pending application sets forth further details of the signal input and processing aspects of screened inductance sensors.

I claim:

1. A sensor comprising a stator and a rotor, the rotor being mounted for rotational displacement relative to the stator but being substantially fixedly located relative to the stator in the direction of the axis of relative rotor and stator rotation, the stator having a substantially cylindrical drive winding for establishing a drive field and a sense winding in which a voltage therefor is induced in the presence of said drive field, the sense winding being a two-terminal winding, extending around the periphery of a notional cylinder which is substantially coaxial with said cylindrical drive winding, and having a plurality of coils extending circumferentially of said notional cylinder, each successive coil in a direction circumferential of said notional cylinder being wound in the opposite electrical sense to each adjacent coil, and each said coil having two circumferentially spaced-apart, axially-extending winding portions and two axially spaced-apart, circumferentially-extending winding portions so that each said coil substantially defines a rectangle in development of the generally cylindrical sense winding, and the rotor having a conductive screen within which eddy currents are generated in the presence of said drive field to establish a counter-field opposing said drive field, said conductive screen being rotatable with the rotor relative to the stator so that said conductive screen is displaceable relative to said sense winding in a direction circumferential of said notional cylinder, and said conductive screen having a surface region which is substantially parallel to a notional cylindrical surface defined by said sense winding, said sense winding being shaded by said conductive screen to a varying extent during rotation of the rotor relative to the stator to thereby vary the voltage induced in said sense winding, said drive winding being configured so that in the absence of said conductive screen said drive field is substantially even over said sense winding in the direction of relative displacement of said conductive screen and said sense winding, and said drive winding being disposed radially inwardly of the circumferentially-extending winding portions of the sense winding at one axial end thereof.

2. A sensor according to claim 1, wherein the drive winding is disposed so that said circumferentially-extending winding portions of the sense winding at said one axial end thereof are generally aligned in the radial direction with an axially central region of the drive winding extending over a portion thereof located substantially midway between its axial ends to thereby establish a substantially uniform, locally axially-directed drive field in the region of said winding portions.

3. A sensor according to claim 1, wherein said circumferentially-extending winding portions of the sense winding at said one axial end thereof substantially define a plane intersecting said cylindrical drive winding at a location substantially midway between the axial ends of the drive winding.

4. A sensor according to claim 1, wherein the drive winding is distributed over an axial length which is a multiple of the maximum thickness of any of said circumferentially-extending winding portions of the sense winding inwardly of which said drive winding is disposed and said circumferentially-extending winding portions are generally aligned with an axially central region of the drive winding extending over a portion thereof located substantially midway between its axial ends so that a substantially uniform, locally axially-directed drive field may be established in the region of said winding portions.

5. A sensor according to claim 1, wherein the dimensions of the conductive screen substantially correspond to those of each coil of the sense winding, so that said conductive screen substantially overlies said coil when aligned therewith.

6. A sensor according to claim 1, wherein each axial end of the conductive screen projects axially outwardly of respective planes defined by the circumferentially-extending winding portions of the sense winding at the axial ends of the sense winding.

7. A sensor according to claim 1, wherein the rotor has an annular rotor disc portion, and said conductive screen is located at the outer periphery of said rotor disc portion.

8. A sensor according to claim 7, wherein said rotor disc portion is aligned substantially axially with the circumferentially-extending winding portions of said sense winding at the other axial end of said sense winding from said one axial end thereof radially inwardly of which said drive winding is disposed.

9. A sensor according to claim 8, wherein at least a portion of said conductive screen extends axially from said rotor disc portion towards said one axial end of said sense winding.

10. A sensor according to claim 1, wherein the rotor has an axially-extending sleeve portion underlying the drive winding radially inwardly thereof.

11. A sensor according to claim 1, wherein the stator has a radially inner cylindrical portion for carrying the drive winding and a radially outer cylindrical portion for carrying the sense winding.

12. A sensor according to claim 11, wherein said radially outer cylindrical portion of the stator has slots on a radially inner face region thereof to accommodate the axially-extending portions of the sense winding.

13. A sensor according to claim 1, further comprising a second sense winding having a plurality of coils spaced apart on said notional cylinder from those of the first-mentioned sense winding, so that the shading of each coil of the second sense winding is spaced apart from the shading of each coil of the first-mentioned sense winding.

14. A sensor according to claim 13, wherein said second and first-mentioned sense windings are disposed so that their respective outputs during rotation of the rotor relative to the stator are in phase quadrature.

15. A sensor according to claim 1, wherein the rotor of the sensor is mounted on an extension of the motor shaft of a brushless d.c. motor.

16. A sensing system including a sensor comprising a stator and a rotor, the rotor being mounted for rotational displacement relative to the stator but being substantially fixedly located relative to the stator in the direction of the axis of relative rotor and stator rotation, the stator having a substantially cylindrical drive winding for establishing a drive field and a sense winding in which a voltage therefor is induced in the presence of said drive field, the sense winding being a two-terminal winding, extending around the periphery of a notional cylinder which is substantially coaxial with said cylindrical drive winding, and having a plurality of coils extending circumferentially of said notional cylinder, each successive coil in a direction circumferential of said notional cylinder being wound in the opposite electrical sense to each adjacent coil, and each said coil having two circumferentially spaced-apart, axially-extending winding portions and two axially spaced-apart, circumferentially-extending winding portions, so that each said coil substantially defines a rectangle in a development of the generally cylindrical sense winding, and the rotor having a conductive screen within which eddy currents are generated in the presence of said drive field to establish a counter-field opposing said drive field, said conductive screen being rotatable with the rotor relative to the stator so that said conductive screen is displaceable relative to said sense winding in a direction circumferential of said notional cylinder, and said conductive screen having a surface region which is substantially parallel to a notional cylindrical surface defined by said sense winding, said sense winding being shaded by said conductive screen to a varying extent during rotation of the rotor relative to the stator to thereby vary the voltage induced in said sense winding, said drive winding being configured so that in the absence of said conductive screen said drive field is substantially even over said sense winding in said direction of relative displacement of said conductive screen and said sense winding, and said drive winding being disposed radially inwardly of the circumferentially-extending winding portions of the sense winding at one axial end thereof; the system also including means for applying an alternating voltage to said drive winding and means for processing the output signal from said sense winding to provide a signal indicative of the relative disposition of said conductive screen and said sense winding.

17. A sensing system according to claim 16, wherein the rotor of the sensor is mounted on an extension of the motor shaft of a brushless d.c. motor.

* * * * *